April 14, 1931.  E. A. BESTE  1,800,981
HANDLE ATTACHING MEANS
Filed Oct. 12, 1925
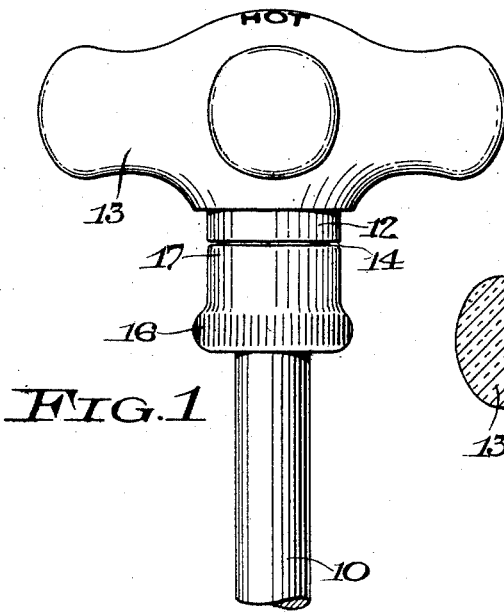
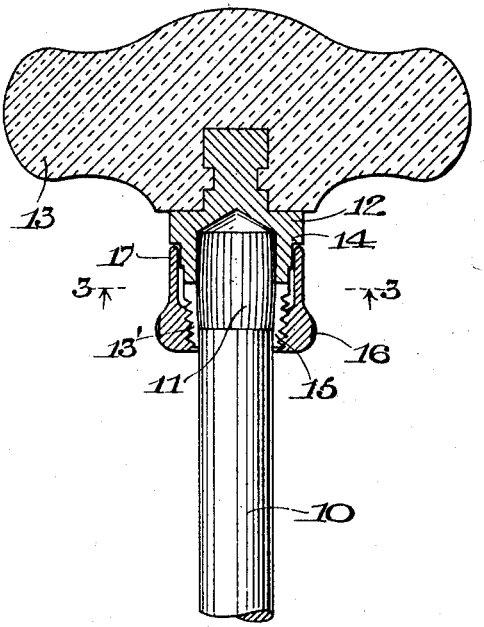
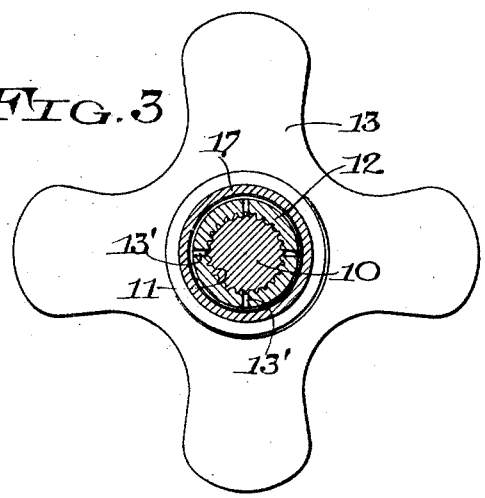
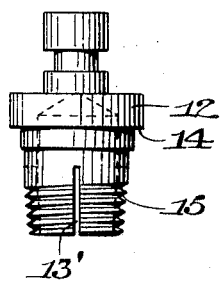
WITNESSES
M. E. Downey
C. L. Neal
INVENTOR
Ernst A. Beste
By
A. S. Caldwell
ATTORNEY Patented Apr. 14, 1931

1,800,981

UNITED STATES PATENT OFFICE

ERNST A. BESTE, OF KOHLER, WISCONSIN, ASSIGNOR TO KOHLER COMPANY, OF KOHLER, WISCONSIN, A CORPORATION OF WISCONSIN

HANDLE-ATTACHING MEANS

Application filed October 12, 1925. Serial No. 62,121.

This invention relates to handle attaching means for valve handles and the like and has for its object to permit the handle to be adjusted in position on the stem as for causing an indicating word appearing thereon to be properly positioned when the valve is closed. Various means have been suggested for this purpose but the present invention is believed to have the advantage of simplicity of construction and inexpensive manufacture and is at the same time neat in its appearance and effective in its adjustability and in its locking engagement.

With the above and other objects in view the invention consists in the handle attaching means as herein claimed and all equivalents.

Referring to the accompanying drawings in which like characters of reference indicate the same parts in different views, Fig. 1 is an elevation of a valve handle provided with the attaching means of this invention;

Fig. 2 is a sectional view thereof;

Fig. 3 is a sectional view on the plane of line 3—3 of Fig. 2, and

Fig. 4 is a detail view of the spud.

In these drawings, 10 indicates the valve stem having its end longitudinally ribbed or fluted or knurled at 11, preferably so as to produce a bulbous enlargement though the knurling may be uniform so as to maintain the cylindrical enlargement or may be tapered away from the end so as to provide a flaring enlargement.

The spud or integral lug 12 joined to the handle 13 of porcelain or other suitable material has a knurled or fluted bore forming a socket to receive the knurled surface of the stem, as plainly shown in Fig. 3, and has a number of slots or kerfs 13' extending upwardly from its lower edge to near the stepped shoulders 14 dividing the tubular end of the lug into fingers. The split end of the spud has an external tapered thread 15.

A lock nut or clamping nut 16 has a corresponding tapered thread and turns on the threaded end of the spud so as to contract the somewhat flexible sections or fingers thereof and cause them to tightly embrace the knurled or tapered portion of the stem. When the knurled portion of the stem is in the form of a slightly spherical enlargement as shown, or when it is in the form of a flaring head, this contraction of the split ends of the spud to tightly fit thereon on the adjacent tapering neck portion of the enlargement effectively locks the handle in place against removal. The lock nut is provided with a cylindrical flange or skirt 17, which preferably extends upwardly to near the stepped shoulder 14 with its outer surface flush with the larger diameter thereof, thus entirely concealing the split end of the spud and presenting a neat and ornamental appearance not suggesting mechanical attachment and easily kept polished.

When the valve mechanism is installed if it is found that the indicating name appearing thereon is not in the proper position, adjustment is readily made by loosening the lock nut until the split fingers thereof release their engagement with the knurled end of the valve stem, permitting the handle to be withdrawn. It may then be replaced in the proper position and, by tightening the lock nut, the split fingers of the spud will be again contracted around the bulbous knurled end of the valve stem to not only prevent relative rotation but to prevent loosening and disconnection of the handle by axial movement as well. When the lock nut is tight the connection is secure without looseness or play and this condition is maintained indefinitely.

What I claim as new and desire to secure by Letters Patent is:

1. A handle fastening comprising a stem provided with a knurled end, a handle provided with a spud having a knurled socket to fit on the knurled end of the stem, said spud being split longitudinally at its end and provided with a tapering screw thread, there being a shoulder on the spud above the slots, and a lock nut fitting on the screw thread for drawing the end of the spud into clamping engagement with the stem, said nut being provided with an annular flange forming an unthreaded skirt extending to near the shoulder of the spud for concealing the thread and slots.

2. The combination with a valve stem having a longitudinal ribbed or fluted end portion and an adjacent tapered portion, the large diameter end of which is adjacent said fluted portion, of a handle comprising a tubular portion internally fluted to form a socket receiving said fluted stem portion and holding the latter against rotation therein, and externally threaded and formed with longitudinal kerfs dividing the end of said tubular portion into fingers and a clamping nut having a tapered threaded portion screwed onto said external threaded tubular portion and forcing said fingers against said tapered stem portion.

3. The combination with a valve stem having a longitudinal ribbed or fluted end portion and an adjacent tapered portion, the large diameter end of which is adjacent said fluted portion, and the small diameter of which is adjacent the main portion of said valve stem, of a handle comprising a tubular portion internally fluted to form a socket receiving said fluted stem portion and holding the latter against rotation therein, and externally threaded and formed with diametrically opposite longitudinal kerfs dividing the end of said tubular portion into fingers and a clamping nut on the valve stem having a tapered threaded portion screwed onto said external threaded tubular portion and forcing said fingers into contact with said tapered stem portion to hold said handle and valve stem against relative axial movement.

In testimony whereof, I affix my signature.

ERNST A. BESTE.